United States Patent [19]

Kemp

[11] Patent Number: 4,810,687

[45] Date of Patent: * Mar. 7, 1989

[54] HYDROTREATING CATALYSTS PREPARED FROM HYDROGELS

[75] Inventor: Richard A. Kemp, Stafford, Tex.

[73] Assignee: Shell Oil Company, Houston, Tex.

[*] Notice: The portion of the term of this patent subsequent to Jan. 5, 2005 has been disclaimed.

[21] Appl. No.: 100,661

[22] Filed: Sep. 24, 1987

[51] Int. Cl.$^4$ ............ B01J 27/19; B01J 27/188; B01J 27/185; C10G 45/08

[52] U.S. Cl. ............... 502/211; 208/216 R; 208/254 H; 502/210; 502/213

[58] Field of Search ............ 502/211, 210, 213

[56] References Cited

U.S. PATENT DOCUMENTS

| | | | |
|---|---|---|---|
| 3,390,100 | 6/1968 | Chomitz et al. | 252/455 |
| 3,864,461 | 2/1975 | Miller et al. | 502/439 |
| 4,019,978 | 4/1977 | Miller et al. | 502/211 |
| 4,036,784 | 7/1977 | Gembicki et al. | 502/314 |
| 4,082,695 | 4/1978 | Rosinski et al. | 252/465 |
| 4,089,774 | 4/1978 | Oleck et al. | 208/89 |
| 4,094,820 | 6/1978 | Mickelson | 502/314 |
| 4,124,537 | 11/1978 | Gembicki et al. | 502/314 |
| 4,192,736 | 3/1980 | Kluksdahl | 208/251 |
| 4,328,127 | 5/1982 | Angevine et al. | 252/439 |
| 4,404,097 | 9/1983 | Angevine et al. | 208/210 |
| 4,615,999 | 10/1986 | Takumi et al. | 502/314 |
| 4,717,704 | 1/1988 | Kemp | 502/211 |
| 4,717,705 | 1/1988 | Kemp | 502/211 |

*Primary Examiner*—Paul E. Konopka
*Attorney, Agent, or Firm*—Pamela J. McCollough

[57] ABSTRACT

This invention relates to a process for preparing highly active hydrotreating catalysts prepared by incorporating an element selected from the group consisting of nickel, cobalt and mixtures thereof, a heavy metal selected from the group consisting of molybdenum, tungsten and mixtures thereof, and a stabilizing amount of phosphorus into an alumina hydrogel. The final calcined catalysts have surface areas at least about 300 m$^2$/g, at least about 20% of the pore volume in pores having diameters greater than about 350 Å and at least about 20% of the pore volume in pores having diameters less than about 70 Å.

88 Claims, No Drawings

HYDROTREATING CATALYSTS PREPARED FROM HYDROGELS

FIELD OF THE INVENTION

This invention relates to a process for preparing highly active alumina hydrogel-derived catalysts.

BACKGROUND OF THE INVENTION

In the catalytic processing of petroleum feedstocks, it is often desirable to alter the pore structure of the catalyst in order to accommodate different types of feeds. For example, when processing feedstocks with no metals or with a low metals content, it may be technically and economically desirable to use narrow-pore catalysts. On the other hand, when processing feedstocks of high metals content, the metals tend to deposit rapidly on the catalyst surface and plug the pores of conventional hydrogen processing catalysts, resulting in a loss of catalytic activity for sulfur and nitrogen removal. In order to maintain hydrotreating activity, it is necessary that the catalyst be high in surface area. To facilitate the diffusion of large components into and out of the catalyst and to prevent surface deposits of coke and metals, large pore diameters are required. These criteria necessitate the use of bimodal catalysts which have high surface areas and a significant fraction of pore volume in large pores. The large pores allow enhanced diffusion of large molecules into the catalyst while the smaller pores, providing most of the surface area, allow for hydroprocessing of the feed. Catalysts of this type can be used as hydrotreating catalysts, especially for residue/demetallization demetalliapplications.

SUMMARY OF THE INVENTION

The present invention relates to a process for the preparation of bimodal catalysts having surface areas at least about 300 m$^2$/g with a significant fraction (at least about 20%) of the pore volume located in pores having diameters greater than about 350 Å and a significant fraction of pores (at least about 20%) in diameters less than about 70 Å. These catalysts are prepared by a process which comprises:

(a) titrating an aqueous solution of an acid aluminum salt and an aqueous solution of a basic aluminum compound, thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with an element selected from the group consisting of nickel, cobalt, and mixtures thereof, a heavy metal selected from the group consisting of molybdenum, tungsten, and mixtures thereof, and a phosphorus-containing compound in an amount of from about 0.2 to about 1.5 moles of phosphorus per mole of heavy metal, at a pH in the range between about 4.0 and about 9.0 and a temperature in the range between about 25° C. and about 100° C. until adsorption of the metal salts onto the gel is sufficient to yield a final catalyst having from about 1% w to about 5% w cobalt and/or nickel and from about 8% w to about 32% w heavy metal, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

It has been found that hydrogel-derived catalysts prepared according to the invention have activities equal to or better than catalysts prepared by conventional techniques when compared on a metals efficiency basis while having densities significantly lower than conventionally prepared catalysts. Two of the major advantages of the hydrogel route are higher metals utilization and lower cost of catalyst manufacture relative to conventionally prepared catalysts. The catalysts prepared according to the invention have high surface areas, at least about 300 m$^2$/g; at least about 20% of the pore volume located in pores having diameters greater than about 350 Å; and at least about 20% of the pore volume located in pores having diameters less than about 70 Å. These catalysts are particularly suitable for residue/demetallization applications.

The present invention also includes using catalysts prepared according to the invention to hydrotreat hydrocarbon feedstocks.

DESCRIPTION OF THE PREFERRED EMBODIMENTS

In the process of the instant invention, a highly active hydrotreating catalyst is prepared by incorporating an element selected from the group consisting of nickel, cobalt and mixtures thereof, a heavy metal selected from the group consisting of molybdenum, tungsten and mixtures thereof, and phosphorus-containing compound into an alumina hydrogel-derived support prepared by titrating an aqueous solution of an acid aluminum compound and an aqueous solution of a basic aluminum compound.

The alumina hydrogel can be prepared by titrating an aqueous solution of one or more aluminum salt(s) with an appropriate acidic or basic material or solution to cause precipitation of the alumina gel. One skilled in the art will recognize that the alumina gel can be prepared by titrating an acidic aluminum salt such as, for example, aluminum sulfate, aluminum nitrate, or aluminum chloride, in aqueous solution with a basic precipitating medium such as, for example, sodium hydroxide or ammonium hydroxide, or, by titrating an alkali metal aluminate such as, for example, sodium aluminate or potassium aluminate, in aqueous solution with an acidic precipitating medium such as, for example, hydrochloric acid or nitric acid. One skilled in the art will recognize that the adjustment of the pH of an aluminum-containing solution to between about 5.5 and about 10.0 will result in precipitation of the aluminum as aluminum hydroxide or hydrated aluminum oxide.

In a preferred embodiment, the alumina hydrogel is prepared by titrating an aqueous solution of an alkali metal aluminate and an aqueous solution of an acid aluminum salt to cause precipitation of the alumina gel. Suitable acidic aluminum salts include aluminum sulfate, aluminum nitrate and aluminum chloride. A preferred species is aluminum sulfate. Suitable alkali metal aluminates are sodium aluminate and potassium aluminate. The precipitation can be carried out by adding an aqueous solution of the basic aluminum species to an aqueous solution of the acidic aluminum species or the procedure can be reversed by adding an aqueous solution of the acidic aluminum species to an aqueous solution of the basic aluminum species (referred to as "sequential precipitation"). Preferably, the precipitation in the instant invention is carried out by simultaneously adding the acid aluminum species and the basic aluminum species to cause precipitation of the hydrogel (referred to as "simultaneous precipitation"). The maximum rate of addition of the acid aluminum species and the basic aluminum species is fixed by the rate at which the two streams can be mixed and the pH and temperature of the system can be effectively controlled.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The temperature and pH of the precipitation are important variables in the preparation of the aluminas into which metals can be incorporated to form catalysts with desirable physical qualities. One skilled in the art would recognize that changes in precipitation temperatures and pHs result in changes in porosities. The optimal temperatures and pHs for the precipitation of the aluminas can be determined with a minimal amount of routine experimentation. In the instant invention, a precipitation temperature typically ranges from about 20° C. to about 90° C., preferably from about 50° C. to about 85° C., more preferably from about 55° C. to about 65° C., and a precipitation pH typically ranges between about 5.5 and about 10.0, preferably between about 5.5 and about 8.0, and more preferably between about 6.0 and about 7.5. The length of time required for the precipitation step is typically from about 15 minutes to about 45 minutes. The period of time for the precipitation should be sufficiently long for adequate mixing of the materials, but not long enough for enhanced particle growth to occur.

After the precipitation step is completed, the pH of the slurry is adjusted to a pH in the range from about 9.0 to about 11.0, preferably about 9.5 to about 10.5, and aged at a temperature in the range from about 20° C. to about 90° C., preferably about 50° C. to about 85° C. for at least 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature.

After aging, the slurry is washed and filtered in routine fashion to remove substantially all of the removable water-soluble salts formed during the precipitation of the hydrogel. The preferred solvent for washing is water although other solvents such as lower alkanols may be utilized.

After washing, the metals are incorporated into the hydrogel. One method for adding the metals to the hydrogel is a reslurry step in which the hydrogel is reslurried with a metals solution containing solubilized salts of an element selected from the group consisting of nickel, cobalt and mixtures thereof, and a heavy metal selected from the group consisting of molybdenum, tungsten and mixtures thereof, and a phosphorus-containing compound sufficient to deposit on the final catalyst from about 1% w to about 5% w nickel and/or cobalt and from about 8% w to about 18% w molybdenum or about 10% w to about 32% w tungsten. When mixtures of molybdenum and tungsten are utilized, the final catalyst contains from about 8% w to about 32% w molybdenum and tungsten. The solution may, however, contain amounts of nickel and/or cobalt and molybdenum or tungsten in excess of that required to deposit the aforesaid amounts of metals, which excess may be removed by washing or other techniques following the reslurry step. A typical metals solution can be prepared by combining a molybdenum and/or tungsten solution with a nickel and/or cobalt solution. The metals solution also contains a stabilizing amount of phosphorus. Typically, the metals solution contains a phosphorus-containing compound in an amount of from about 0.2 to about 1.5 moles of phosphorus per mole of molybdenum or tungsten. As used herein, the term "a phosphorus-containing compound" is generic and refers to one phosphorus-containing compound as well as to more than one phosphorus-containing compound. Suitable phosphorus-containing compounds are the acids of phosphorus and their salts. Typical acids of phosphorus include phosphoric acids, phosphonic acids, phosphinic acids, phosphorous acids and the like. The phosphorus-containing compound is generally selected from the group consisting of phosphoric acid, a phosphate salt and mixtures thereof. Suitable phosphate salts include alkali metal phosphates, alkali metal hydrogen phosphates, ammonium phosphate and ammonium hydrogen phosphate.

The molybdenum solution consists of a water-soluble source of molybdenum oxide such as ammonium heptamolybdate or ammonium dimolybdate dissolved in water and optionally, a phosphorus-containing compound. Hydrogen peroxide may also be used to aid in solution preparation in some cases. A preferred method for preparing the molybdenum solution consists of adding hydrogen peroxide to the solution in the range of about 0.1 to about 1.0 mole of hydrogen peroxide per mole of molybdenum. Optionally, a suitable soluble amine compound such as monoethanolamine, propanolamine or ethylenediamine may be added to the molybdenum solution in order to aid in stabilization of the solution.

The tungsten solution typically consists of ammonium metatungstate dissolved in water and optionally, a phosphorus-containing compound. A preferred method for preparing the tungsten solution consists of adding hydrogen peroxide to the solution in the range of about 0.1 to about 1.0 mole of hydrogen peroxide per mole of tungsten. In addition, a suitable soluble amine compound such as monoethanolamine, propanolamine or ethylenediamine may be added to the tungsten solution in order to aid in stabilization of the solution.

The nickel solution consists of nickel salts dissolved in water and optionally, a phosphorus-containing compound. A wide range of nickel compounds are suitable, such as nickel nitrate, nickel acetate, nickel formate, nickel sulfate, nickel oxide, nickel phosphate, nickel carbonate, nickel chloride, and nickel hydroxide. Two compounds that are especially useful are nickel nitrate and nickel carbonate.

The cobalt solution consists of cobalt salts dissolved in water and optionally, a phosphorus-containing compound. A wide range of cobalt compounds are suitable, such as cobalt nitrate, cobalt hydroxide, cobalt acetate, cobalt oxalate, or cobalt oxide. The preferred cobalt compound is cobalt nitrate.

An alternative method for incorporating the metals into the hydrogel is to add dry, water-soluble metal salts of an element selected from the group consisting of nickel, cobalt and mixtures thereof, dry, water-soluble salts of a heavy metal selected from the group consisting of molybdenum, tungsten and mixtures thereof, and a phosphorus-containing compound to the hydrogel and mix until dissolution and adsorption of the metal salts and phosphorus onto the gel is substantially complete. The metal salts of nickel and/or cobalt and molybdenum and/or tungsten are added to the hydrogel in amounts sufficient to incorporate into the final catalyst from about 1% w to about 5% w cobalt and from about 8% w to about 18% w molybdenum or about 10% w to about 32% w tungsten. When mixtures of molybdenum and tungsten are utilized, the final catalyst contains about 8% w to about 32% w molybdenum and tungsten.

Molybdenum is generally added to the hydrogel as a dry, water-soluble source of molybdenum such as ammonium heptamolybdate or ammonium dimolybdate. Tungsten is typically added to the hydrogel as ammonium metatungstate. Nickel is preferably added to the hydrogel in the form of dry, water-soluble nickel nitrate, nickel acetate, nickel formate, nickel sulfate, nickel oxide, nickel phosphate, nickel carbonate, nickel chloride or nickel hydroxide, with nickel nitrate and nickel carbonate being preferred. Cobalt is added to the hydrogel in the form of dry, water-soluble cobalt nitrate, cobalt hydroxide, cobalt acetate, cobalt oxalate or cobalt oxide, with cobalt nitrate being preferred. The phosphorus-containing compound is typically added, either wet or dry, to the hydrogel in an amount ranging from about 0.2 to about 1.5 moles of phosphorus per mole of molybdenum or tungsten. The phosphorus-containing compound is preferably added directly to the hydrogel as phosphoric acid, a phosphate salt or mixtures thereof. Suitable phosphate salts include alkali metal phosphate, alkali metal hydrogen phosphate, ammonium phosphate and ammonium hydrogen phosphate. Alternatively, the phosphorus-containing compound and the dry nickel and/or cobalt salt can be mixed prior to addition to the hydrogel.

A preferred method of mixing the dry metal salts of nickel and/or cobalt and molybdenum and/or tungsten with the hydrogel consists of adding hydrogen peroxide to the mixture of dry metal salts and hydrogel in an amount ranging from about 0.1 to about 1.0 mole of hydrogen peroxide per mole of molybdenum and/or tungsten. Optionally, a suitable amine compound such a monoethanolamine, propanolamine or ethylenediamine may be added to the mixture of dry metal salts and hydrogel in order to aid in stabilization of the mixture of the metal salts and the hydrogel.

The dry metal salts of nickel and/or cobalt, molybdenum and/or tungsten and the phosphorus-containing compound (if added dry) are typically added to the hydrogel in the form of finely divided particles which are generally 100 mesh or less in size. While particle size is not critical and larger particle sizes may be utilized, it is economically advantageous to use particles which are 100 mesh or less in size.

It is also within the scope of this invention to combine the two methods described above for adding the metals to the hydrogel. For example, one metal may be added to the hydrogel as a dry salt and another added in the form of a solution. Various permutations of this combination of dry salts additions and metals solutions additions would be obvious to one skilled in the art.

The temperature and pH of the step in which the metals solutions and/or the dry metal salts are mixed with the hydrogel are important variables in the preparation of hydrogel-derived catalysts which have acceptable densities and porosities. In general, higher temperatures yield lower density catalysts. The mixing of the hydrogel with the metals solution or the dry metal salts is carried out at a pH in the range between about 4.0 and about 10.0, preferably between about 4.0 and about 9.0, more preferably between about 4.0 and about 8.0, and a temperature in the range between about 25° C. and about 100° C., preferably between about 25° C. and about 80° C., until incorporation of the metals salts into the gel is sufficient to yield a final calcined catalyst having from about 1% w to about 5% w nickel and/or cobalt and from 8% w to about 32% w heavy metal selected from the group consisting of molybdenum, tungsten and mixtures thereof. Typically, the times for mixing the hydrogel and the metals will range from about 0.5 to about 2 hours. Optionally, the resulting material can be washed to remove unadsorbed metals and filtered in routine fashion.

Following the addition of the metals to the hydrogel, the resulting material is partially dried to reduce loss on ignition (LOI) from about 90% to between about 55% and about 65%, preferably between about 55% and about 60%. As used herein, "loss on ignition" is equal to the amount of volatiles present in the hydrogel divided by the amount of volatiles present in the hydrogel plus the dry weight of the hydrogel multiplied by one hundred percent. This reduction in the volatiles content of the hydrogel is critical to the formation of catalysts having at least about 20% of the pore volume in pores having diameters greater than about 350 Å and at least about 20% of the pore volume in pores having diameters less than about 70 Å. Materials which are not dried to the indicated LOIs do not produce the desired bimodal pore size distribution. In addition, materials which are too wet result in catalysts having poor physical properties and materials which are too dry cannot be extruded in a conventional manner. The partially dried material is then extruded using conventional methods such as, for example, a Bonnot extruder, dried more completely and calcined. Drying is accomplished by conventional means. It may be carried out by forced draft drying, vacuum drying, air drying or similar means. Drying temperatures are not critical and depend upon the particular means utilized for drying. Drying temperatures will typically range from about 50° C. to about 150° C.

After drying, the material is calcined to produce the finished catalyst. The material may be calcined in an oxidizing or neutral atmosphere, although air is preferred. However, if binders and/or lubricants are used the material is heated in an oxygen-containing atmosphere, preferably air, in order to burn out the binders and lubricants. Calcining temperatures will typically range from about 300° C. to about 900° C. Burn-out temperatures will depend on the concentration of oxygen in the burn-out atmosphere as well as the burn-out time involved. Typically, burn-out temperatures will range from about 300° C. to about 900° C. Drying, calcining and burn-out may be combined in one or two steps. Most frequently the calcining and/or burn-out steps are combined using an oxygen-containing atmosphere.

Certain other processing steps may be incorporated into the above-described procedure without deviating from the scope and intent of this invention. For example, an intensive mixer-muller or a twin-screw mixer can be used to process the material prior to extrusion.

The final catalysts are found to have surface areas greater than about 300 m²/g, nitrogen pore volumes ranging from about 0.4 to about 1.2 cc/g and with at least 20% of their mercury pore volume in pores having diameters greater than about 350 Å and at least about 20%, preferably about 35%, of their pore volume in pores having diameters less than about 70 Å. In general, the metals contents of the final catalysts range from about 1% w to about 5% w nickel and/or cobalt, preferably from about 2.5% w to about 4% w nickel and/or cobalt, and from about 8% w to about 18% w, preferably from about 10% w to about 14% w molybdenum or about 10% w to about 32% w, preferably from about 18% w to about 26% w tungsten.

The catalysts prepared in the instant invention can be suitably applied to hydrocarbon conversion processes such as hydrocracking, hydrotreating, isomerization, hydrogenation, dehydrogenation, oligomerization, alkylation, dealkylation and the like.

The catalysts of the instant invention are most commonly employed in hydrotreating and/or hydrocracking feedstocks ranging in volatilities from naphthas to petroleum residues, including materials derived from tar sands, shale oils and the like. Reaction temperatures will typically range from about 300° F. to about 900° F., preferably from about 500° F. to about 850° F. Reaction pressures are generally within the range of about 200 psig to about 3500 psig, preferably from about 600 psig to about 2500 psig. Reactions are conducted at liquid hourly space velocities within the range of about 0.05 to about 15 reciprocal hour.

Multiple uses of these feedstocks after treating with the catalysts of this invention are possible. Depending on the particular feedstocks treated, suitable uses can include conversion unit feedstocks such as thermal cracking and hydrocracking, or finished products such as gasoline, diesel, airline turbine fuel, furnace oils, solvents, fuels oils and asphalts.

The process for preparing the catalysts of the instant invention will be further described below by the following examples which are provided for illustration and which are not to be construed as limiting the invention.

EXAMPLE 1

99.0 kilograms of aluminum sulfate solution were prepared by solubilizing 11.3 kilograms of gibbsite (alpha-alumina trihydrate, 34% LOI) in 87.7 kilograms of 27% sulfuric acid at a temperature slightly above 100° C. The solution was allowed to cool to 60° C. prior to use. 76.4 kilograms of sodium aluminate solution were prepared by solubilizing 28.2 kilograms of gibbsite (alpha-alumina trihydrate, 34% LOI) in 48.2 kilograms of 36% sodium hydroxide at a temperature slightly above 115° C. This solution was also allowed to cool to 60° C. prior to use. These two solutions were metered under computer control into a precipitation vessel containing a deionized water heel (140 kilograms) held at 60° C., maintaining a constant pH of 7.0 and a temperature of 60° C. The precipitation duration was fixed at 45 minutes. After the precipitation step was complete excess sodium aluminate solution (13.5 kilograms) was added to the slurry to raise the pH to the desired aging pH of 10.0. Total solution quantities used: acid - 66.7 kilograms, base - 54.9 kilograms. The slurry was aged for one hour at the elevated pH. The slurry was then filtered in a single step on a 1'×10' horizontal belt vacuum filter and washed with deionized water. The resulting alumina hydrogel generally had a water content between 75% and 90%, basis dry weight of alumina.

Nickel nitrate hexahydrate (227.31 g) was reacted with 85% phosphoric acid (211.99 g) and diluted to 1 liter with deionized water. Ammonium heptamolybdate (340.48 g) was reacted with 30% hydrogen peroxide (100.7 ml) and monoethanolamine (57.0 g) and diluted to 1 liter using deionized water. The two solutions were combined with intensive stirring. A portion of alumina hydrogel (4900 g, 80.76% LOI - 943 grams dry weight) was reslurried with this solution and allowed to react for 2 hours at a pH of 5.5 (adjust with NH$_4$OH) at 80° C. The slurry was then filtered hot and washed with 3 liters of deionized water, and then sucked dry on the Buchner funnel. The catalyst hydrogel was then dried in a forced air oven at approximately 120° C. until the LOI of the gel was 60.0%. The material was mulled in a Simpson mix muller for 15 minutes and was then extruded through a conventional Bonnot extruder. Drying at 120° C. was followed by calcination at 950° F. for two hours. The properties of the catalyst are listed in Tables I and II.

EXAMPLE 2

99.0 kilograms of aluminum sulfate solution were prepared by solubilizing 11.3 kilograms of gibbsite (alpha-alumina trihydrate, 34% LOI) in 87.7 kilograms of 27% sulfuric acid at a temperature slightly above 100° C. The solution was allowed to cool to 60° C. prior to use. 76.4 kilograms of sodium aluminate solution were prepared by solubilizing 28.2 kilograms of gibbsite (alpha-alumina trihydrate, 34% LOI) in 48.2 kilograms of 36% sodium hydroxide at a temperature slightly above 115° C. This solution was also allowed to cool to 60° C. prior to use. These two solutions were metered under computer control into a precipitation vessel containing a deionized water heel (140 kilograms) held at 60° C., maintaining a constant pH of 7.0 and a temperature of 60° C. The precipitation duration was fixed at 45 minutes. After the precipitation step was complete excess sodium aluminate solution (13.5 kilograms) was added to the slurry to raise the pH to the desired aging pH of 10.0. Total solution quantities used: acid - 66.7 kilograms, base - 54.9 kilograms. The slurry was aged for one hour at the elevated pH. The slurry was then filtered in a single step on a 1'×10' horizontal belt vacuum filter and washed with deionized water. The resulting alumina hydrogel generally had a water content between 75% and 90%, basis dry weight of alumina.

Cobalt nitrate hexahydrate (146.06 g) was reacted with 85% phosphoric acid (181.31 g) and diluted to 1 liter with deionized water. Ammonium heptamolybdate (222.13 g) was reacted with 30% hydrogen peroxide (87.0 ml) and diluted to 1 liter using deionized water. The two solutions were combined with intensive stirring. A portion of alumina hydrogel (4876 g, 81.79% LOI - 888 grams dry weight) was reslurried with this solution and allowed to react for 2 hours at a pH of 5.5 (adjust with NH$_4$OH) at 25° C. The slurry was then filtered and washed with 3 liters of deionized water, and then sucked dry on the Buchner funnel. The catalyst hydrogel was then dried in a forced air oven at approximately 120° C. until the LOI of the gel was 60.0%. The material was mulled in a Simpson mix muller for 15 minutes and was then extruded through a conventional Bonnot extruder. Drying at 20° C. was followed by calcination at 950° F. for two hours. The properties of the catalyst are listed in Tables I and II.

COMPARATIVE EXAMPLE A

A catalyst was prepared in a manner similar to Example 1 except that the hydrogel was not partially dried prior to the extrusion step. The properties of the catalyst are listed in Tables I and II.

COMPARATIVE EXAMPLE B

A catalyst was prepared in a manner similar to Example 2 except that the hydrogel was not partially dried prior to the extrusion step. The properties of the catalyst are listed in Tables I and II.

COMPARATIVE EXAMPLE C

A catalyst was prepared utilizing a non-hydrogel technique. The catalyst is commercially available from Shell under the name S-317. The properties of the catalyst are listed in Tables I and II.

CATALYST TESTING

Catalyst samples were used to hydrotreat a catalytically-cracked heavy gas oil (CCHGO) in a trickle-flow reactor. Ten ccs of the extruded catalyst were crushed and sieved to a 16–45 mesh, diluted with silicon carbide, and loaded into a typical trickle-flow reactor tube. The catalyst was presulfided with a 5% $H_2S/H_2$ (v/v) gas mixture at 700° F. for 2 hours prior to testing. A CCHGO was passed over the catalyst at 675° F. and 850 psig $H_2$ with a $H_2$/oil equal to 4.0. Rate constants are reported relative to the non-hydrogel catalyst (Comparative Example C) and are calculated basis the total metals contents of the catalyst. Measured rate constants include hydrogenation, denitrification and desulfurization. Specific catalyst performance characteristics are presented in Table III.

TABLE I

| | EXAMPLE 1 | EXAMPLE 2 | COMPARATIVE EXAMPLE A | COMPARATIVE EXAMPLE B | COMPARATIVE EXAMPLE C |
|---|---|---|---|---|---|
| Catalyst Properties | | | | | |
| Aging pH[a] | 10.4 | 10.5 | 11.0–12.0 | 11.0–12.0 | — |
| Density g/cc[b] | 0.47 | 0.46 | 0.72 | 0.77 | 0.60 |
| Reslurry pH[c] | 5.5 | 5.5 | 5.0 | 5.5 | — |
| $N_2$ Surface Area m²/g | 364.0 | 395.0 | 428.0 | 448.0 | 240.0 |
| $N_2$ Pore Volume cc/g[e] | 0.63 | 0.73 | 0.54 | 0.49 | — |
| LOI Prior to Extrusion[f] | 60 | 62.5 | ~90 | ~90 | — |
| % wt. Nickel[g] | 3.4 | — | 1.2 | — | 2.52 |
| % wt. Cobalt[g] | — | 2.3 | — | 2.2 | — |
| % wt. Molybdenum[h] | 11.0 | 8.5 | 11.8 | 7.5 | 12.0 |
| % wt. Phosphorus[i] | 4.7 | 4.1 | 3.4 | 2.0 | 0.0 |

TABLE II

| Hg Pore[j] Size Dist | EXAMPLE 1 | EXAMPLE 2 | COMPARATIVE EXAMPLE A | COMPARATIVE EXAMPLE B | COMPARATIVE EXAMPLE C |
|---|---|---|---|---|---|
| Catalyst Pore Size Distributions | | | | | |
| <50 ang | 24.5 | 22.0 | 86.3 | 87.0 | 2.6 |
| 50–70 ang | 18.4 | 27.9 | 4.8 | 4.3 | 11.6 |
| 70–100 ang | 9.7 | 13.1 | 3.0 | 2.9 | 31.2 |
| 100–150 ang | 5.3 | 6.2 | 2.8 | 2.5 | 24.4 |
| 150–350 ang | 5.3 | 5.8 | 2.5 | 2.5 | 11.0 |
| >350 ang | 36.7 | 24.9 | 0.7 | 0.9 | 19.3 |

[a]Measured using an Orion 231 pH meter and Orion electrodes.
[b]209 cc volume fully settled in a graduated cup and weighed.
[c]Measured using an Orion 231 pH meter and Orion electrodes.
[d]BET (Brunauer, S., Emmet, P. Y. and Teller, E., J. Am. Chem. Soc. 60, 309–316 (1938)) by nitrogen adsorption/desorption, Micromeritics Digisorb 2500 Instrument.
[e]By nitrogen adsorption, Micromeritics Digisorb 2500 Instrument.
[f]Loss-on-ignition: the fraction of volatile material removed when held at 950° F. for two hours, expressed as a percentage of the original weight.
[g]Weight percent determined by neutron activation analysis or atomic absorption spectroscopy.
[h]Weight percent determined by neutron activation analysis or atomic absorption spectroscopy.
[i]Weight percent determined by neutron activation analysis or atomic absorption spectroscopy.
[j]Determined by mercury intrusion, to 60,000 psi using a Micromeritics Autopore 9210, using a 130° contact angle and 0.473 N/m surface tension of mercury. Numbers listed are percent pore volume.

TABLE III

| | CCHGO (METALS BASIS) | | | NO. GRAMS METAL IN 10 CC CAT. | DENSITY G/CC | WEIGHT % | | |
|---|---|---|---|---|---|---|---|---|
| | H | N | S | | | Ni | Co | Mo |
| Specific Catalyst Performance | | | | | | | | |
| Example 1 | 1.19 | 1.73 | 1.32 | 0.677 | 0.47 | 3.4 | — | 11.0 |
| Example 2 | 1.62 | 1.98 | 2.42 | 0.497 | 0.46 | — | 2.3 | 8.5 |

TABLE III-continued

| | Specific Catalyst Performance | | | | | | | |
|---|---|---|---|---|---|---|---|---|
| | CCHGO (METALS BASIS) | | | NO. GRAMS METAL IN | DENSITY | WEIGHT % | | |
| | H | N | S | 10 CC CAT. | G/CC | Ni | Co | Mo |
| Comparative Example C | 1.00 | 1.00 | 1.00 | 0.870 | 0.60 | 2.5 | — | 12.0 |

I claim as my invention:

1. A process for preparing highly active hydrotreating catalysts having surface areas at least about 300 m$^2$/g, at least about 20% of the pore volume in pores having diameters greater than about 350 Å and at least about 20% of the pore volume in pores having diameters less than abouty 70 Å, which process comprises:
   (a) titrating an aqueous solution of one or more aluminum salt(s) with a titrating agent, thereby forming a precipitate,
   (b) aging the precipitate at a temperature ranging from about 20° C. to about 90° C. for at least about 15 minutes at a pH ranging from about 8.0 to about 12.0,
   (c) washing the precipitate,
   (d) mixing the precipitate with salts of an element selected from the group consisting of nickel, cobalt, and mixtures thereof, and salts of a heavy metal selected from the group consisting of molybdenum, tungsten, and mixtures thereof, and a phosphorus-containing compound in an amount of from about 0.2 to about 1.5 moles of phosphorus per mole of heavy metal at a pH in the range between about 4.0 and about 9.0 and a temperature in the range between about 25° C. and about 100° C. until adsorption of the salts onto the precipitate is sufficient to yield a final catalyst having from about 1% w to about 5% w cobalt and/or nickel and from about 8% w to about 32% w heavy metal,
   (e) partially drying the product of step (d) to reduce loss on ignition to between about 55% and about 65%,
   (f) extruding the product of step (e), and
   (g) drying and calcining the product of step (f) at a temperature ranging from about 300° C. to about 900° C.

2. The process of claim 1 wherein the precipitation is carried out at a pH in the range between about 5.5 and about 8.0.

3. The process of claim 1 wherein the precipitation is carried out at a temperature between about 50° C. and about 85° C.

4. The process of claim 1 wherein the aging pH is in the range between about 9.5 and about 10.5.

5. The process of claim 1 wherein step (d) is carried out at a pH in the range between about 4.0 and about 8.0.

6. The process of claim 1 wherein said phosphorus-containing compound is selected from the group consisting of phosphoric acid, a phosphate salt and mixtures thereof.

7. The process of claim 1 wherein step (d) contains salts of nickel and molybdenum.

8. The process of claim 7 wherein said catalyst contains from about 2.5% w to about 4% w nickel and from about 8% w to about 18% w molybdenum.

9. The process of claim 1 wherein step (d) contains salts of cobalt and molybdenum.

10. The process of claim 9 wherein said catalyst contains from about 2.5% w to about 4% w cobalt and from about 8% w to about 18% w molybdenum.

11. A process for preparing highly active hydrotreating catalysts having surface areas at least about 300 m$^2$/g, at least about 20% of the pore volume in pores having diameters greater than about 350 Å and at least about 20% of the pore volume in pores having diameters less than about 70 Å, which process comprises:
   (a) precipitating an aqueous solution of one or more aluminum salt(s) by adjusting the pH of said solution to a range between about 5.5 and about 10.0 and a temperature in the range between about 20° C. and about 90° C., thereby forming a precipitate,
   (b) aging the precipitate at a temperature ranging from about 20° C. to about 90° C. for at least about 15 minutes at a pH ranging from about 9.0 to about 11.0,
   (c) washing the precipitate,
   (d) mixing the precipitate with one or more solution(s) containing salts of a heavy metal selected from the group consisting of molybdenum, tungsten and mixtures thereof, salts of an element selected from the group consisting of nickel, cobalt and mixtures thereof, and a phosphorus-containing compound in an amount of from about 0.2 to about 1.5 moles of phosphorus per mole of heavy metal at a pH in the range between about 4.0 and about 9.0 and a temperature in the range between about 25° C. and about 100° C. until adsorption of the salts onto the precipitate is sufficient to yield a final catalyst having from about 1% w to about 5% w nicket and/or cobalt and from about 8% w to about 32% w heavy metal,
   (e) partially drying the product of step (d) to reduce loss on ignition to between about 55% and about 65%,
   (f) extruding the product of step (e), and
   (g) drying and calcining the product of step (f) at a temperature ranging from about 300° C. to about 900° C.

12. The process of claim 11 wherein the precipitation is carried out at a pH in the range between about 5.5 and about 8.0.

13. The process of claim 11 wherein the precipitation is carried out at a termperature between about 50° C. and about 85° C.

14. The process of claim 11 wherein the aging pH is in the range between about 9.5 and about 10.5.

15. The process of claim 11 wherein step (d) is carried out at a pH in the range between about 4.0 and about 8.0.

16. The process of claim 11 wherein said phosphorus-containing compound is selected from the group consisting of phosphoric acid, a phosphate salt and mixtures thereof.

17. The process of claim 11 wherein said solution in step (d) contains salts of nickel and molybdenum.

18. The process of claim 17 wherein said catalyst contains from about 2.5% w to about 4% w nickel and from about 8% w to about 18% w molybdenum.

19. The process of claim 11 wherein said solution in step (d) contains salts of cobalt and molybdenum.

20. The process of claim 19 wherein said catalyst contains from about 2.5% w to about 4% w cobalt and from about 8% w to about 18% w molybdenum.

21. A process for preparing highly active hydrotreating catalysts having surface areas at least about 300 m$^2$/g, at least about 20% of the pore volume in pores having diameters greater than about 350 Å and at least about 20% of the pore volume in pores having diameters less than about 70 Å, which process comprises:

(a) precipitating an aqueous solution of one or more aluminum salt(s) by adjusting the pH of said solution to a range between about 5.5 and about 10.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble salts of an element selected for the group consisting of nickel, cobalt and mixtures thereof, dry, water-soluble salts of a heavy metal selected from the group consisting of molybdenum, tungsten and mixtures thereof, and a phosphorus-containing compound in an amount of from about 0.2 to about 1.5 moles of phosphorus per mole of heavy metal, at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

22. The process of claim 21 wherein the precipitation is carried out at a pH in the range between about 5.5 and about 8.0.

23. The process of claim 21 wherein the precipitation is carried out at a temperature between about 50° C. and about 85° C.

24. The process of claim 21 wherein the aging pH is in the range between about 9.5 and about 10.5.

25. The process of claim 21 wherein step (d) is carried out at a pH in the range between about 4.0 and about 8.0.

26. The process of claim 21 wherein said phosphorus-containing compound is selected from the group consisting of phosphoric acid, a phosphate salt and mixtures thereof.

27. The process of claim 21 wherein said salts in step (d) are salts of nickel and molybdenum.

28. The process of claim 27 wherein said catalyst contains from about 2.5% w to about 4% w nickel and from about 8% w to about 18% w molybdenum.

29. The process of claim 21 wherein said salts in step (d) are salts of cobalt and molybdenum.

30. The process of claim 29 wherein said catalyst contains from about 2.5% w to about 4% w cobalt and from about 8% w to about 18% w molybdenum.

31. A process for preparing highly active hydrotreating catalysts having surface areas at least about 300 m$^2$/g, at least about 20% of the pore volume in pores having diameters greater than about 350 Å and at least about 20% of the pore volume in pores having diameters less than about 70 Å, which process comprises:

(a) precipitating an aqueous solution of one or more aluminum salt(s) by adjusting the pH of said solution to a range between about 5.5 and about 10.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing a dry, water-soluble salt of a heavy metal selected from the group consisting of molybdenum, tungsten and mixtures thereof, and a mixture of a dry, water-soluble salt selected from the group consisting of nickel, cobalt and mixtures thereof, and a phosphorus-containing compound in an amount of from about 0.2 to about 1.5 moles of phosphorus per mole of heavy metal with the precipitate at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

32. The process of claim 31 wherein the precipitation is carried out at a pH in the range between about 5.5 and about 8.0.

33. The process of claim 31 wherein the precipitation is carried out at a temperature between about 50° C. and about 85° C.

34. The process of claim 31 wherein the aging pH is in the range between about 9.5 and about 10.5.

35. The process of claim 31 wherein step (d) is carried out at a pH in the range between about 4.0 and about 8.0.

36. The process of claim 31 wherein said phosphorus-containing compound is selected from the group consisting of phosphoric acid, a phosphate salt and mixtures thereof.

37. The process of claim 31 wherein said salts in step (d) salts are salts of nickel and molybdenum.

38. The process of claim 37 wherein said catalyst contains from about 2.5% w to about 4% w nickel and from about 8% w to about 18% w molybdenum.

39. The process of claim 31 wherein said salts in step (d) salts are salts of cobalt and molybdenum.

40. The process of claim 39 wherein said catalyst contains from about 2.5% w to about 4% w cobalt and from about 8% w to about 18% w molybdenum.

41. A process for preparing highly aciive hydrotreating catalysts having surface areas at least about 300 m$^2$/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt with an aqueous solution of a basic aluminum compound at a pH in the range between about 5.5 and about 10.0 and a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with one or more solution(s) containing salts of a heavy metal selected from the group consisting of molybdenum, tungsten and mixtures thereof, and salts of an element selected from the group consisting of nickel, cobalt and mixtures thereof, and a phosphorus-containing compound in an amount of from about 0.2 to about 1.5 moles of phosphorus per mole of heavy metal at a pH in the range between about 4.0 and about 9.0 and a termperature in the range between about 25° C. and about 100° C. until adsorption of the salts onto the precipitate is sufficient to yield a final catalyst having from about 1% w to about 5% w nickel and/or cobalt and from about 8% w to about 32% w heavy metal, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

42. The process of claim 41 wherein the precipitation is carried out at a pH in the range between about 5.5 and about 8.0.

43. The process of claim 41 wherein the precipitation is carried out at a temperature between about 50° C. and about 85° C.

44. The process of claim 41 wherein the aging pH is in the range between about 9.5 and about 10.5.

45. The process of claim 41 wherein step (d) is carried out at a pH in the range between about 4.0 and about 8.0.

46. The process of claim 41 wherein said phosphorus-containing compound is selected from the group consisting of phosphoric acid, a phosphate salt and mixtures thereof.

47. The process of claim 41 wherein said solution in step (d) contains salts of nickel and molybdenum.

48. The process of claim 47 wherein said catalyst contains from about 2.5% w to about 4% w nickel and from about 8% w to about 18% w molybdenum.

49. The process of claim 41 wherein said solution in step (d) contains salts of cobalt and molybdenum.

50. The process of claim 49 wherein said catalyst contains from about 2.5% w to about 4% w cobalt and from about 8% w to about 18% w molybdenum.

51. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt with an aqueous solution of a basic aluminum compound at a pH in the range between about 5.5 and about 10.0 and a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble salts an element selected from the group consisting of nickel, cobalt and mixtures thereof, dry, water-soluble salts of a heavy metal selected from the group consisting of molybdenum, tungsten and mixtures thereof, and a phosphorus-containing compound in an amount of from about 0.2 to about 1.5 moles of phosphorus per mole of heavy metal at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

52. The process of claim 51 wherein the precipitation is carried out at a pH in the range between about 5.5 and about 8.0.

53. The process of claim 51 wherein the precipitation is carried out at a temperature between about 50° C. and about 85° C.

54. The process of claim 51 wherein the aging pH is in the range between about 9.5 and about 10.5.

55. The process of claim 51 wherein step (d) is carried out at a pH in the range between about 4.0 and about 8.0.

56. The process of claim 51 wherein said phosphorus-containing compound is selected from the group consisting of phosphoric acid, a phosphate salt and mixtures thereof.

57. The process of claim 51 wherein said salts in step (d) are salts of nickel and molybdenum.

58. The process of claim 57 wherein said catalyst contains from about 2.5% w to about 4% w nickel and from about 8% w to about 18% w molybdenum.

59. The process of claim 51 wherein said salts in step (d) are salts of cobalt and molybdenum.

60. The process of claim 59 wherein said catalyst contains from about 2.5% w to about 4% w cobalt and from about 8% w to about 18% w molybenum.

61. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt with an aqueous solution of a basic aluminum compound at a pH in the range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing a dry, water-soluble salt of heavy metal selected from the group consisting of molybdenum, tungsten and mixtures thereof, and a mixture of a dry, water-soluble salt selected from the group consisting of nickel, cobalt and mixtures thereof and a phosphorus-containing compound in an amount of from about 0.2 to about 1.5 moles of phosphorus per mole of heavy metal with the precipitate at a pH in the range between about 4.0 and about 9.0 and a temperature in the range between about 25° C. and about 100° C. to yield a final catalyst having from about 1% w to about 5% w nickel and/or cobalt and from about 8% w to about 32% w heavy metal,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

62. The process of claim 61 wherein the precipitation is carried out at a pH in the range between about 5.5 and about 8.0.

63. The process of claim 61 wherein the precipitation is carried out at a temperature between about 50° C. and about 85° C.

64. The process of claim 61 wherein the aging pH is in the range between about 9.5 and about 10.5.

65. The process of claim 61 wherein step (d) is carried out at a pH in the range between about 4.0 and about 8.0.

66. The process of claim 61 wherein said phosphorus-containing compound is selected from the group consisting of phosphoric acid, a phosphate salt and mixtures thereof.

67. The process of claim 61 wherein said salts in step (d) are salts of nickel and molybdenum.

68. The process of claim 67 wherein said catalyst contains from about 2.5% w to about 4% w nickel and from about 8% w to about 18% w molybdenum.

69. The process of claim 61 wherein said salts in step (d) are salts of cobalt and molybdenum.

70. The process of claim 69 wherein said catalyst contains from about 2.5% w to about 4% w cobalt and from about 8% w to about 18% w molybdenum.

71. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:
(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with one or more solution(s) containing molybdate or dimolybdate salts and nickel salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

72. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:
(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with one or more solution(s) containing molybdate or dimolybdate salts and cobalt salts and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

73. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble nickel salts and dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

74. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble cobalt salts and dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

75. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing a dry, water-soluble molybdate or dimolybdate salt and a mixture of a dry, water-soluble nickel salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

76. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing a dry, water-soluble molybdate or dimolybdate salt and a mixture of a dry, water-soluble cobalt salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

77. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) precipitating an aqueous solution of an acid aluminum salt selected from the group consisting of aluminum sulfate, aluminum nitrate and aluminum chloride, with an aqueous solution of a base at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with one or more solution(s) containing molybdate or dimolybdate salts and nickel salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

78. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) precipitating an aqueous solution of an acid aluminum salt selected from the group consisting of aluminum sulfate, aluminum nitrate and aluminum chloride with an aqueous solution of a base at a pH in the range between about 5.5 and about 8.0 and a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with one or more solution(s) containing molybdate or dimolybdate salts and cobalt salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

79. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt selected from the group consisting of aluminum sulfate, aluminum nitrate and aluminum chloride, with an aqueous solution of a base at a pH in the range between about 5.5 and about 8.0 at a temperature in the range between about 20° C. and about 90° C., thereby forming a precipitate (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble nickel salts and dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w nickel and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

80. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:

(a) titrating an aqueous solution of an acid aluminum salt selected from the group consisting of aluminum sulfate, aluminum nitrate and aluminum chloride, with an aqueous solution of a base at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing the precipitate with dry, water-soluble cobalt salts and dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w cobalt and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

81. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:
(a) titrating an aqueous solution of an acid aluminum salt selected from the group consisting of aluminum sulfate, aluminum nitrate and aluminum chloride, with an aqueous solution of a base. at a pH in the range between about 5.5 and about 8.0 at a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing a dry, water-soluble molybdate or dimolybdate salt and a mixture of a dry, water-soluble nickel salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w nickel and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

82. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:
(a) titrating an aqueous solution of an acid aluminum salt selected from the group consisting of aluminum sulfate, aluminum nitrate and aluminum chloride, with an aqueous solution of a base, at a pH in the range between about 5.5 and about 8.0 at a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing a dry, water-soluble molybdate or dimolybdate salt and a mixture of a dry, water-soluble cobalt salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w cobalt and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

83. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:
(a) titrating an aqueous solution of an acid with an aqueous solution of a basic aluminum compound selected from the group consisting of sodium aluminate and potassium aluminate at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with one or more solution(s) containing molybdate or dimolybdate salts and nickel salts, and phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w nickel and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

84. A process for preparing highly active hydrotreating catalysts having surface areas at least about 300 m²/g, at least about 20% of the pore volume in pores having diameters greater than about 350 Å and at least about 20% of the pore volume in pores having diameters less than about 70 Å, which process comprises:
(a) titrating an aqueous solution of an acid with an aqueous solution of a basic aluminum compound selected from the group consisting of sodium aluminate and potassium aluminate at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0, (c) washing the precipitate,
(d) mixing the precipitate with one or more solution(s) containing molybdate or dimolybdate salts and cobalt salts, and a phosphoric acid in an amount of from about 0.2 to about 1.5 moles of phosphorus per mole of molybdenum at a pH in the range between about 4.0 and about 8.0 and a temperature in the range between about 25° C. and about 100° C. until adsorption of the salts onto the precipitate is sufficient to yield a final catalyst having from about 2.5% w to about 4% w cobalt and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

85. A process for preparing highly active hydrotreating catalysts having surface areas at least about 300 $m^2/g$, at least about 20% of the pore volume in pores having diameters greater than about 350 Å and at least about 20% of the pore volume in pores having diameters less than about 70 Å, which process comprises:
(a) titrating an aqueous solution of an acid with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with dry, water-soluble nickel salts and dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w nickel and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

86. A process for preparing highly active hydrotreating catalysts having surface areas at least about 300 $m^2/g$, at least about 20% of the pore volume in pores having diameters greater than about 350 Å and at least about 20% of the pore volume in pores having diameters less than about 70 Å, which process comprises:
(a) titrating an aqueous solution of an said with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing the precipitate with dry, water-soluble cobalt salts and dry, water-soluble molybdate or dimolybdate salts, and phosphoric acid in an amount of from about 0.2 to about 1.5 moles of phosphorus per mole of molybdenum, at a pH in the range between about 4.0 and about 8.0 and a temperature in the range between about 25° C. and about 100° C. to yield a final catalyst having from about 2.5% w to about 4% w cobalt and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

87. A process for preparing highly active hydrotreating catalysts having surface areas at least about 300 m2/g, at least about 20% of the pore volume in pores having diameters greater than about 350 Å and at least about 20% of the pore volume in pores having diameters less than about 70 Å, which process comprises:
(a) titrating an aqueous solution of an acid with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate,
(b) aging the precipitate at a temperature ranging from about 20° C. to about 90° C. for at least about 15 minutes at a pH ranging from about 9.0 to about 11.0,
(c) washing the precipitate,
(d) mixing a dry, water-soluble molybdate or dimolybdate salt and a mixture of a dry, water-soluble nickel salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w nickel and from about 10% w to about 14% w molybdenum,
(e) partially drying the product of step (d) to reduce loss on ignition to between about 55% and about 65%,
(f) extruding the product of step (e), and
(g) drying and calcining the product of step (f) at a temperature ranging from about 300° C. to about 900° C.

88. A process for preparing highly active hydrotreating catalysts having surface areas at least about 300 m2/g, at least about 20% of the pore volume in pores having diameters greater than about 350 Å and at least about 20% of the pore volume in pores having diameters less than about 70 Å, which process comprises:
(a) titrating an aqueous solution of an acid with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate, (b) aging the precipitate at a temperature ranging from about 20° C. to about 90° C. for at least about 15 minutes at a pH ranging from about 9.0 to about 11.0, (c) washing the precipitate, (d) mixing a dry, water-soluble molybdate or dimolybdate salt and a mixture of a dry, water-soluble cobalt salt and phosphoric acid in an amount of from about 0.2 to about 1.5 moles of phosphorus per mole of molybdenum with the precipitate at a pH in the range between about 4.0 and about 8.0 and a temperature in the range between about 25° C. and about 100° C. to yield a final catalyst having from about 2.5% w to about 4% w cobalt and from about 10% w to about 14% w molybdenum, (e) partially drying the product of step (d) to reduce loss on ignition to between about 55% and about 65%, (f) extruding the product of step (e), and (g) drying and calcining the product of step (f) at a temperature ranging from about 300° C. to about 900° C.

* * * * *